May 17, 1932. A. MEYER 1,859,102
CAR RETARDING APPARATUS
Filed Aug. 30, 1930
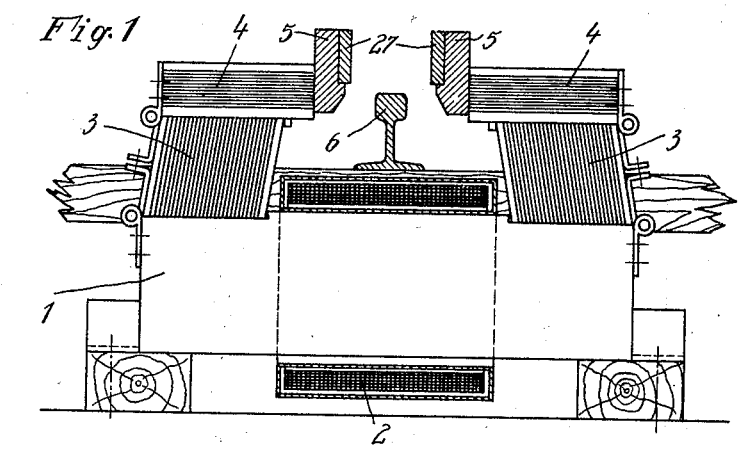
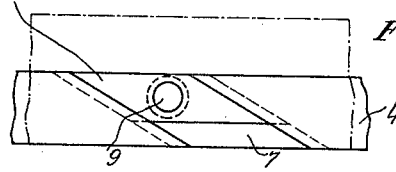
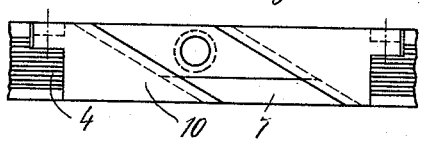
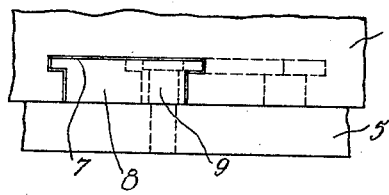
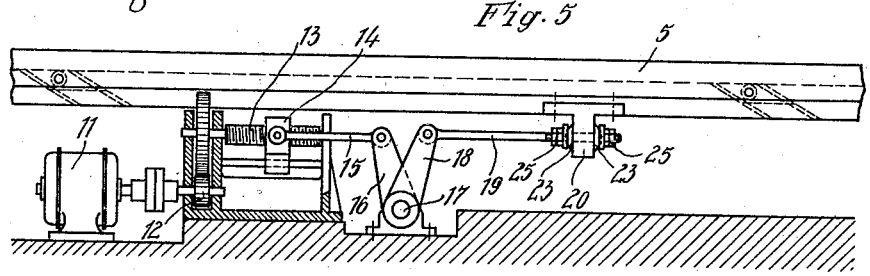
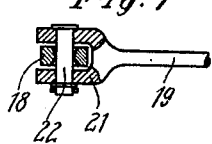
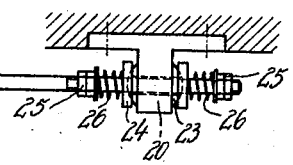
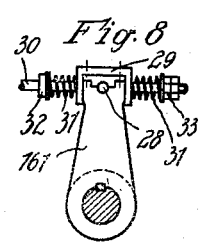
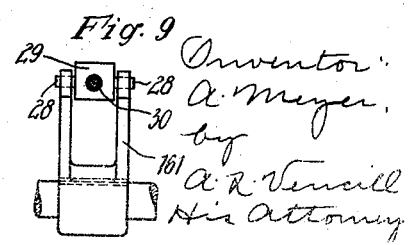

Patented May 17, 1932

1,859,102

UNITED STATES PATENT OFFICE

AUGUST MEYER, OF BERLIN-SCHONEBERG, GERMANY

CAR RETARDING APPARATUS

Application filed August 30, 1930. Serial No. 478,848.

This invention relates to car retarding apparatus of the kind adapted to be located adjacent to the track rails of a track over which the vehicle to be retarded travels and comprising brake bars or their equivalent adapted to be automatically brought into engagement with the wheels or other portions of the vehicle by electro-magnetic action, so that retardation of the vehicle is not only effected by frictional action but also due to the eddy currents generated by the movement of the wheels or other portions of the vehicle relative to the magnetic flux traversing the brake bars.

In apparatus of this character it is evidently of advantage to arrange the brake bars in such a manner that, when in operative engagement with the wheels of the vehicle for the purpose of effecting retardation, the brake bars will engage with the wheels at a point as high as possible above the rim or flange of the wheel so as to increase the braking action. This desirable location of the brake bars is however limited by the necessity for avoiding the fouling of the axle boxes, brake rigging or other parts of the vehicle by the brake bars and it is generally only possible to permit the brake bars to project upwards beyond the heads of the track rails to a small extent. In the case of a locomotive the permissible projection of the brake bars above the track rails is considerably less to avoid fouling and since it is generally necessary in shunting operations in hump yards to permit the passage of trains including a locomotive over the retarding apparatus, arrangements must be provided for lowering the upwardly projecting portions of retarding apparatus from their normal positions when required.

The present invention has for its principal object to provide improved lowering mechanism for this purpose, a further object being to provide arrangements for operating the lowering mechanism as will be hereinafter described.

The invention is illustrated by way of example in the accompanying drawings of which Figure 1 is a transverse sectional view of car retarding apparatus embodying one form of the invention, Figure 2 being a view in side elevation of a portion of the apparatus shown in Figure 1.

Figure 3 is a plan view of Figure 2, Figure 4 being a view similar to Figure 2 but illustrating a modified construction.

Figure 5 is a view in side elevation partly sectional illustrating the arrangement of the motor mechanism for raising and lowering the brake shoes.

Figure 6 is a view in side elevation of a portion of the mechanism shown in Figure 5 but illustrating a modified construction, Figure 7 being a plan view of the end of the connecting rod shown in Figures 5 and 6.

Figures 8 and 9 are views in side and end elevation respectively showing a modified form of a portion of the mechanism shown in Figure 5.

Referring now to the drawings it will be seen that the apparatus comprises a yoke member 1 provided with an energizing coil 2 and magnetically connected by means of laminated core members 3 to the brake bars 4 arranged on each side of a track rail 6. The brake bars 4 are each provided with a longitudinally extending brake shoe 5.

Formed on the inner vertical face of each of the brake bars 4 is a plurality of inclined recesses or grooves 7, one of which is shown in Figures 2 and 3, the recesses 7 being undercut as shown in Figure 3. Each of the recesses 7 contains a slider 8 loosely fitting therein and secured by means of a bolt 9 to the brake shoe 5. As shown in Figure 4 illustrating a preferred construction, a solid block 10 containing the recess 7 is inserted into the length of the brake bar 4 the latter being of laminated construction as indicated in Figures 1 and 4.

It will be understood that with the arrangements above described a longitudinal displacement of the brake shoes 5 in one direction or the other will cause the brake shoes 5 to be raised or lowered relative to the brake bars 4 owing to the inclined movement of the sliders 8 in the recesses or grooves 7.

One form of mechanism for effecting the longitudinal displacement of the brake shoes 5 for this purpose is illustrated in Figure 5 of the drawings, and comprises an electric motor 11 operatively connected through suitable gearing 12 to a screw-threaded spindle 13. The spindle 13 is provided with an internally screw-threaded nut 14 carried on the spindle so that as the motor 11 rotates in one direction or the other, the nut 14 will be moved to the right or left along the spindle 13.

The nut 14 is pivotally connected to one end of a link rod 15, the opposite end of which is pivotally connected to an arm 16 rigidly mounted upon a rotatable shaft 17. Also rigidly mounted upon the shaft 17 is an arm 18 which is pivotally connected to one end of a link rod 19. The opposite end of the rod 19 passes through a relatively large aperture in a bracket 20 secured to the brake shoe 5, the vertical sides of the bracket 20 being provided with spherical bearing surfaces 23 engaging with washers 24 surrounding the rod 19 and held in position by means of nuts 25.

A preferred construction for the connection between the rod 19 and the arm 18 is shown in Figure 7 and comprises a pivot pin 22 traversing the forked end 21 of the rod 19, the aperture in the arm 18 through which the pivot pin 22 passes being coned at both ends so as to permit a certain amount of universal motion of the pivot pin relative to the arm 18.

It will be understood that in operation the supply of energizing current to the coil 2 of the retarding apparatus will cause a corresponding magnetic flux to traverse the yoke 1, core members 3, brake bars 4 and the brake shoes 5 so as to cause the brake shoes 5 to move towards each other and to engage with the wheel of a vehicle travelling along the track rail 6. When the coil 2 is deenergized the brake bars 4 and brake shoes 5 are moved apart by spring or other suitable mechanism not shown.

It will thus be apparent that the brake bars 4 are subject to limited transverse movement towards and away from one another during operation and the connections above described of the link rod 19 to the arm 18 and to the bracket 20 are designed to permit this transverse movement of the brake bars 4 and the brake shoes 5 while enabling longitudinal displacement of the brake shoes 5 relative to the brake bars 4 to be effected so as to cause the raising or lowering of the brake shoes 5.

In Figures 1 and 5 the brake shoes 5 are shown in their raised positons for effecting the braking action as above described. When it is required that a locomotive should pass over the retarding apparatus, operating current is supplied to the motor 11 in such a manner as to cause the motor to rotate in a direction serving to move the nut 14 along the spindle 13 towards the right. This movement of the nut 14 is transmitted through the link rod 15, the arms 16 and 18 and the link rod 19 to the bracket 20 which accordingly moves the brake shoe 5 towards the right relative to the brake bar 4. The brake shoe 5 is thus lowered to an extent sufficient to avoid any danger of the brake shoes 5 being fouled by the locomotive during its passage over the retarding apparatus.

When it is again desired to raise the brake shoes 5 into their normal positions, operating current is supplied to the motor 11 so as to cause it to rotate in the reverse direction and thereby move the nut 14 along the spindle 13 towards the left. The bracket 20 and the brake bars 5 are thus caused to be displaced towards the left and owing to the action of the sliders 8, the brake bars 5 are moved upwards during their longitudinal movement.

It will be understood that both the brake shoes 5 are similarly caused to be raised and lowered simultaneously by the action of the motor 11 and the brake shoes of a plurality of car retarding devices may be similarly operated from a single motor 11 by providing for instance suitable arms 18 on a common shaft 17.

Figure 6 illustrates a modified connection of the link rod 19 to the bracket 20 in which springs 26 are interposed between the washers 24 and the bearing surfaces 23 for the purpose of preventing shocks from being transmitted from the brake shoes 5 to the raising and lowering mechanism. Another form of connection for the same purpose is illustrated in Figures 8 and 9 in which a forked arm 161 is mounted upon the shaft 17 and carries a block 29 pivotally mounted on the arm 161 by means of a pivot pin 28. The link rod 30 connected to the nut 14 passes loosely through the block 30 and is resiliently coupled thereto by means of springs 31 interposed between the block 29 and a collar 32 secured to the rod 30 and between the block 29 and nuts 31 on the end of the rod 30.

As shown in Figure 1 the vertical face of each of the brake shoes 5 may be provided with a bearing strip 27 secured to the brake shoe, the bearing strip 27 being thus renewable and being preferably composed of material having a relatively high electrical resistance such, for instance, as silicon steel.

It will be evident that the invention provides extremely simple and effective means whereby the brake shoes of the retarding apparatus can be lowered to permit the passage of a locomotive without necessitating the lowering of the brake bars themselves thereby avoiding complication and greatly reducing the cost of the apparatus.

Although only certain forms of construction embodying the invention have been described and illustrated by way of example it is to be understood that various modifications may be made therein within the scope of the appended claims without exceeding the ambit of the invention.

Having now described my invention, what

I claim as new and desire to secure by Letters Patent is:—

1. In car retarding apparatus the combination of a brake bar extending horizontally adjacent to a track rail over which the vehicle to be retarded travels, a brake shoe member extending horizontally to and in contact with a vertical face of said brake bar and a plurality of sliding members secured to said brake shoe member and located in inclined recesses in said vertical face of said brake bar.

2. In car retarding apparatus the combination of a brake bar extending horizontally adjacent to a track rail over which the vehicle to be retarded travels, a brake shoe member extending horizontally to and in contact with a vertical face of said brake bar, a plurality of sliding members secured to said brake shoe member and located in inclined recesses in said vertical face of said brake bar, and means for effecting movement of said brake shoe member relative to said brake bar in a longitudinal direction.

3. In car retarding apparatus the combination of a brake bar extending horizontally adjacent to a track rail over which the vehicle to be retarded travels, a brake shoe member extending horizontally to and in contact with the vertical face of said brake bar, a plurality of sliding members secured to said brake shoe member and located in inclined recesses in the vertical face of said brake bar, a motor, means operated by said motor for effecting a horizontal displacement of said brake shoe member, and a coupling permitting universal motion connecting said displacing means to said brake shoe member.

4. In car retarding apparatus the combination of a brake bar extending horizontally adjacent to a track rail over which the vehicle to be retarded travels, a brake shoe member extending horizontally to and in contact with a vertical face of said brake bar, a plurality of sliding members secured to said brake shoe member and located in inclined recesses in said vertical face of said brake bar, a rotatable shaft, an arm carried by said shaft, a link rod connected to said arm, means for resiliently coupling said link rod to said brake shoe member and means for rotating said shaft.

In testimony whereof I have hereunto set my hand.

AUGUST MEYER.